Figure 1:
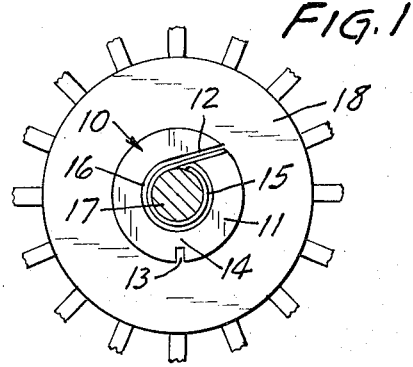

United States Patent [19]
Nestor

[11] 3,790,292
[45] Feb. 5, 1974

[54] SELF-TIGHTENING COUPLER

[75] Inventor: Leonard R. Nestor, St. Paul, Minn.

[73] Assignee: Minnesota Mining and Manufacturing Company, St. Paul, Minn.

[22] Filed: Oct. 5, 1972

[21] Appl. No.: 295,161

[52] U.S. Cl. ............... 403/351, 403/365, 403/367
[51] Int. Cl. .............................................. F16d 1/06
[58] Field of Search .. 287/52.09, 52.04, 52.06, 110, 287/114, 115; 285/305; 29/526, 433; 403/243, 350, 351, 352, 365, 367

[56] References Cited
UNITED STATES PATENTS

| 1,672,601 | 6/1928 | Brent | 287/52.09 |
| 3,203,716 | 8/1965 | Lannen | 29/526 |
| 2,756,484 | 7/1956 | Booth | 29/526 |

Primary Examiner—Jordan Franklin
Assistant Examiner—Conrad L. Berman
Attorney, Agent, or Firm—Alexander, Sell, Steldt and DeLaHunt

[57] ABSTRACT

A radially expandable body having a cylindrical bore and longitudinally slotted to provide access thereto is coupled to a smooth shaft within said bore by tangential insertion of a thin flexible filler strip. The body may fit within a hub for coupling said hub to said shaft.

15 Claims, 7 Drawing Figures

PATENTED FEB 5 1974  3,790,292

SELF-TIGHTENING COUPLER

This invention relates to the mounting of machine parts on rotating shafts. The invention provides an inexpensive and uncomplicated self-tightening coupler device which, while not limited thereto, has been found to be particularly useful in coupling small plastic rotary fans to smooth metal drive shafts.

Attempts to use prior art coupling devices, such for example as keys and set screws, on plastic hubs frequently results in cracking or chipping of the hub due to the inherent lack of strength in the plastic material. Insertion of metal cores or bushings, e.g. during molding of the plastic part, provides increased strength to resist the disruptive effects of keys and set-screws but is time-consuming and expensive.

The present invention provides a self-tightening coupler of simplified construction. The coupler is easily inserted between shaft and hub and is then tightened against both surfaces merely by rotation of the two. A tigh slip-resistant fit is obtained but without such excessive or localized stresses as might cause failure of the hub and without requiring previous roughening or deformation of the shaft. Both plastic and metal constructions are effective. The same principle is applicable to cams, stops, and other generally tubular structures required to be rigidly mounted on smooth shafts.

Figure 2:
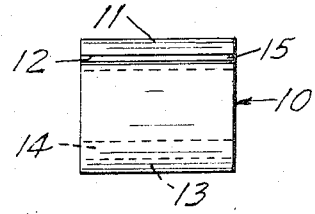
Figure 3:
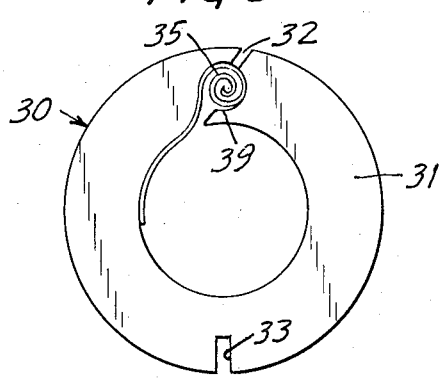
Figure 4:
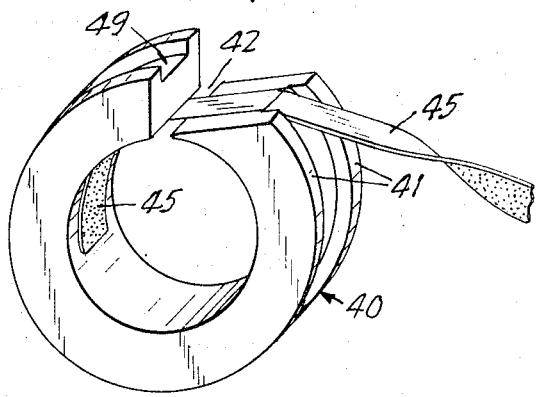
Figure 5:
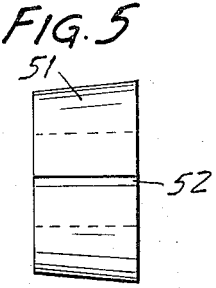
Figure 6:
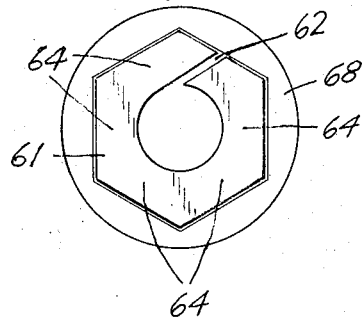
Figure 7:
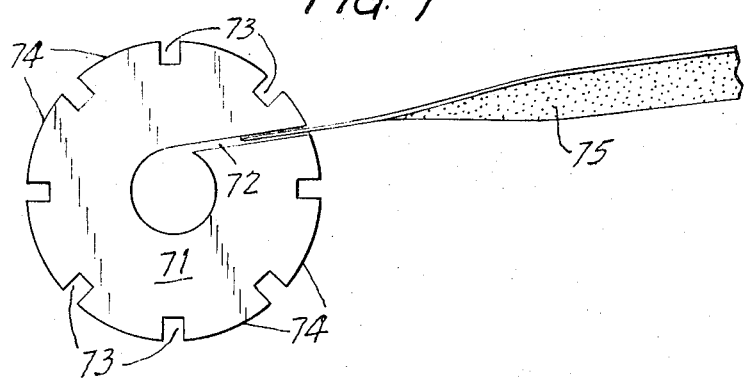

In the drawing,

FIG. 1 is an end elevation showing a coupler supporting a plastic fan hub on a metal shaft, FIG. 2 is a side elevation of the coupler of FIG. 1, FIG. 3 is an end elevation of a self-contained coupler, FIG. 4 is a view in perspective, of another form of self-contained coupler, FIG. 5 is a side elevation of a tapered coupler body, FIG. 6 is an end elevation of a multi-faceted coupler body, and FIG. 7 is an end elevation of a coupler having a multi-grooved body.

The coupler 10 of FIGS. 1 and 2 comprises a generally tubular body 11 slotted longitudinally and tangentially of the central bore to provide an entry slot 12 and grooved longitudinally along the outer portion generally opposite the inner mouth of the slot 12 to form a shallow groove 13 and leave a relatively thin section 14 of increased flexibility. A thin flexible liner strip 15 extends from the slot 12 into the annular space 16 between the body 11 and a shaft 17 where it is tightly held. A hub 18 here shown as the hub of a fan with the blades broken away for convenience is illustration, fits around the coupler assembly.

The parts are assembled as follows. The body 11 is first slipped onto the shaft 17 and the strip 15 is fed through the slot 12 and into the annular opening 16. Relative rotation of body and shaft then draws the strip into the annular space and is continued until sufficient of the strip has been taken up to cause a preliminary tightening. Any extended or excess strip is removed and the assembly is placed within the hub 18. Further rotation of the body on the shaft then draws the remaining segment of the strip into the annular space, causes radial expansion of the body against the interior surface of the hub, and tightens the body onto the shaft. Radial expansion of the body is facilitated by the hinge effect obtained at the thin section 14. As the coupler expands and begins to grip the hub, torque is readily applied through the hub itself so that a tight fit is quickly and easily attained.

In the device of FIGS. 1 and 2 the removal of excess strip, prior to applying the hub, leaves only a short segment within the slot 12 for completing the compression fit, and it is therefore necessary to obtain a relatively tight preliminary fit before removing the excess. The structures shown in FIG. 3 and in FIG. 4 illustrate two improved strip-supplying means. The size of the slot 32 in body 31 of FIG. 3 is expanded within the wall of the body to form a cylindrical opening 39 within which a major portion of the strip 35 is coiled. Additional length of strip is thus provided, to be drawn into the annular space for further expanding and tightening the coupler. In the coupler 40 of FIG. 4 an outer annular channel 49 provides sufficient space for a considerable length of liner strip 45, the outer ridges 41 then making contact with the inner surface of the hub when the strip 45 is forced through the open-mouthed slot 42 and around a shaft.

Where desired, the tubular body may have an other than cylindrical periphery. The body 51 of FIG. 5 is tapered to fit within a corresponding tapered hub. The body 61 of FIG. 6 has a hexagonal shape providing at each facet a thinner section 64 between the periphery and the bore for permitting radial expansion. The grooves 73 and lands 74 of the body 71 of FIG. 7 similarly provide sections of increased flexibility for permitting expansion of the body on forced entry of a strip 75 through the slot 72 and around a shaft. Where a hub is included, it may be, and preferably is, provided with cooperating facets or splines, as illustrated in FIG. 6 by internally faceted hub 68.

Placing the entry slot tangent to the inner bore of the body provides for maximum ease of insertion of the liner strip and is generally preferred, particularly where shaft and body are relatively close-fitting. With more loosely fitting pieces, or where the inner edges of the slot are appropriately rounded or chamfered, the slot may lie along a radial plane or at some intermediate angle. The slot 42 of FIG. 4 will be seen to be defined by one tangential and one radial face providing for exceptionally easy insertion of the strip 45 but also producing an unduly wide break in the outer periphery.

Thin flexible metal shim stock may be used as the liner strip, in which case the inner end of the strip may if necessary be adhered to, or otherwise prevented from sliding on, the surface of the shaft, for example using a small amount of self-tacky adhesive, in starting the strip into the annular space between shaft and body. A preferred structure employs an abrasive-coated strip, such for example as a strip of thin, tough, high tensile strength polyethylene terephthalate polyester foil having bonded to one surface a layer of very fine abrasive grit. A product known as lapping film, typically having nominally 30 micron silicon carbide grit bonded to 3 mil (0.075 mm.) polyester film to a total thickness of 5 mils (0.125 mm.), has been found eminently satisfactory. The abrasive surface faces and frictionally grips the surface of the shaft, while the uncoated surface of the strip slides easily against the inner surface of the body to facilitate application of the coupler.

The liner strip may be the full width of the body, or some lesser width. In the structure shown in FIG. 4 the width of the strip will be no greater than the width of the channel 49 between the ridges 41. Two or more separate narrow strips in side-by-side position may be used, the structure being particularly useful where the coupler is to be attached to the opposing ends of two axially aligned shafts. In such shaft coupling applications, or in other applications not involving a hub, a simple reinforcing ring may be placed over the coupler body to provide further tightening capability or to avoid possible breakage of the body member.

Expansion slots, such as the slot 13 in the device of FIG. 1, are essential where the body 11 is otherwise unduly rigid or is susceptible of breakage, but may be dispensed with when using sufficiently thin and tough body structures, as indicated by the following specific illustrative examples. In one, a body 11 of polystyrene, having an axial length of 15 mm., outside diameter of 22 mm., and inside diameter of 12 mm., is desirably provided with a slot 13 having a depth of 2.5 mm. and situated at a position approximately opposite the inner opening of the tangential slot 12 as shown in FIGS. 1 and 3, in order to permit fully adequate radial expansion without cracking of the body. By way of contrast, in another example a body member, constructed of aluminum alloy to a length of 25 mm., with an outside diameter of 26 mm., inside diameter of 18.5 mm., and circumferentially channeled to a depth of 1 mm., requires no expansion slot. Both bodies are used with a filler strip of lapping film. The polymeric body is best used as shown in FIG. 1, i.e. within a surrounding hub or other reinforcing ring. The metal body may be similarly used, but in addition may be applied in the absence of any outer reinforcement, for example as a stop or cam. Application of either form of coupler to a smooth metal shaft under hand-applied torque produces such a tight fit as to require the use of a wrench for subsequent removal.

What is claimed is as follows:

1. A self-tightening coupler for fitting onto a smooth surfaced cylindrical shaft, comprising a radially expandable body member having a cyindrical shaft-receiving bore and slotted along its entire length to provide a narrow access slot from the periphery to said bore, and a thin filler strip inserted through said slot for advancing between the outer periphery of said shaft and the body surface defining said bore upon relative rotation of shaft and body to provide a tight frictional fit between shaft, strip and body.

2. Coupler of claim 1 wherein said body member is generally tubular with at least one longitudinal section of reduced wall thickness for facilitating radial expansion.

3. Coupler of claim 2 wherein said body member is longitudinally grooved opposite the access slot.

4. Coupler of claim 2 wherein said slot is enlarged within the wall of said body to provide a cavity, and wherein at least a portion of said strip is stored within said cavity.

5. Coupler of claim 2 wherein said body is exteriorly channeled to provide an annular channel, and wherein at least a portion of said strip is stored within said channel.

6. Coupler of claim 1 including a reinforcing ring circumferentially surrounding said body.

7. Coupler of claim 1 wherein said filler strip includes means for providing higher frictional forces between itself and a shaft inserted within said bore than between itself and the body surface defining said bore.

8. Coupler of claim 7 wherein said strip has bonded to one surface a layer of abrasive particles.

9. A structure comprising a radially expandable body member having a cylindrical bore and an access slot along its entire length extending from the periphery to the bore, a smooth-surfaced cylindrical shaft passing through said bore, and a thin flexible filler strip inserted radially through said slot and compressed between said shaft and the inner surface of said body member to an extent sufficient to cause radial expansion of said member and tight frictional engagement between body member and shaft.

10. Structure of claim 9 wherein said body member is generally tubular with at least one longitudinal section of reduced wall thickness facilitating said radial expansion.

11. Structure of claim 10 wherein said body member is longitudinally grooved opposite the access slot.

12. Structure of claim 11 including a reinforcing ring circumferentially surrounding said body and wherein said body is radially expanded into tight-fitting contact with said ring.

13. Structure of claim 12 wherein said ring is a hub for a rotative device.

14. Structure of claim 9 wherein said body member is externally channeled to provide an annular channel of a width at least that of said filler strip.

15. Structure of claim 10 wherein said body member has a faceted or grooved exterior surface and is in tight-fitting contact with the inner cooperatively faceted or splined surface of a reinforcing ring.

* * * * *